United States Patent
Iyer et al.

(10) Patent No.: US 11,102,130 B2
(45) Date of Patent: *Aug. 24, 2021

(54) METHOD AND SYSTEM FOR SHAPING TRAFFIC FROM AN EGRESS PORT IN A SOFTWARE-DEFINED WIDE AREA NETWORK

(71) Applicant: Versa Networks, Inc., San Jose, CA (US)

(72) Inventors: Sridhar Iyer, Sunnyvale, CA (US); Apurva Mehta, Cupertino, CA (US)

(73) Assignee: Versa Networks, Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/732,092

(22) Filed: Dec. 31, 2019

(65) Prior Publication Data
US 2020/0259750 A1   Aug. 13, 2020

Related U.S. Application Data

(63) Continuation of application No. 15/814,296, filed on Nov. 15, 2017, now Pat. No. 10,523,570.

(51) Int. Cl.
*H04L 12/815* (2013.01)
*H04L 12/26* (2006.01)
*H04L 12/24* (2006.01)

(52) U.S. Cl.
CPC .......... *H04L 47/22* (2013.01); *H04L 41/0816* (2013.01); *H04L 43/0823* (2013.01); *H04L 43/0876* (2013.01); *H04L 43/0894* (2013.01)

(58) Field of Classification Search
None
See application file for complete search history.

(56) References Cited

U.S. PATENT DOCUMENTS

| | | | |
|---|---|---|---|
| 8,462,624 B2 | 6/2013 | McCanne et al. | |
| 8,514,715 B2 | 8/2013 | Jin et al. | |
| 2004/0267503 A1 | 12/2004 | Batterberry et al. | |
| 2016/0205171 A1 | 7/2016 | Reddy et al. | |
| 2016/0330076 A1 | 11/2016 | Tiwari et al. | |
| 2017/0026263 A1 | 1/2017 | Gell et al. | |

*Primary Examiner* — Chi H Pham
*Assistant Examiner* — Raul Rivas
(74) *Attorney, Agent, or Firm* — Loza & Loza, LLP (57) ABSTRACT

A method for shaping traffic from an egress port in a software-defined wide-area network (SD-WAN) involves obtaining a stored network bandwidth measurement of the network bandwidth between a source endpoint and a destination endpoint, obtaining a current shaping rate used by the source endpoint when sending data to the destination endpoint, obtaining an updated measurement of the network bandwidth between the source endpoint and the destination endpoint, determining a new shaping rate based on the stored network bandwidth measurement, the current shaping rate measurement, and the updated measurement of network bandwidth, and configuring the shaping rate used by the source endpoint when sending data to the destination endpoint with the new shaping rate.

16 Claims, 9 Drawing Sheets

|         | NY REGION ||| CA REGION ||| CO REGION |||
|---------|-----|-----|-----|-----|-----|-----|-----|-----|-----|
|         | NY1 | NY2 | NY3 | CA1 | CA2 | CA3 | CO1 | CO2 | CO3 |
| NY1 (NY REGION) | ■ | ■ | ■ | 10Mbps | | | | 50Mbps | |
| NY2 (NY REGION) | ■ | ■ | ■ | | | | | | |
| NY3 (NY REGION) | ■ | ■ | ■ | | | | | | |
| CA1 (CA REGION) | 10Mbps | | | ■ | ■ | ■ | 10Mbps | | |
| CA2 (CA REGION) | | | | ■ | ■ | ■ | | | |
| CA3 (CA REGION) | | | | ■ | ■ | ■ | | | |
| CO1 (CO REGION) | | | | 10Mbps | | | ■ | ■ | ■ |
| CO2 (CO REGION) | 50Mbps | | | | | | ■ | ■ | ■ |
| CO3 (CO REGION) | | | | | | | ■ | ■ | ■ |

FIG. 6

FIG. 7A — Table 500

| | | NY REGION | | | CA REGION | | | CO REGION | | |
|---|---|---|---|---|---|---|---|---|---|---|
| | | NY1 | NY2 | NY3 | CA1 | CA2 | CA3 | CO1 | CO2 | CO3 |
| NY REGION | NY1 | ■ | ■ | ■ | 10Mbps | | | 50Mbps | 50Mbps | 50Mbps |
| | NY2 | ■ | ■ | ■ | 10Mbps | | | | | |
| | NY3 | ■ | ■ | ■ | 10Mbps | | | | | |
| CA REGION | CA1 | 10Mbps | 10Mbps | 10Mbps | ■ | ■ | ■ | 10Mbps | | |
| | CA2 | | | | ■ | ■ | ■ | 10Mbps | | |
| | CA3 | | | | ■ | ■ | ■ | 10Mbps | | |
| CO REGION | CO1 | 50Mbps | | | 10Mbps | 10Mbps | 10Mbps | ■ | ■ | ■ |
| | CO2 | 50Mbps | | | | | | ■ | ■ | ■ |
| | CO3 | 50Mbps | | | | | | ■ | ■ | ■ |

|  |  | NY REGION | | | CA REGION | | | CO REGION | | |
|---|---|---|---|---|---|---|---|---|---|---|
|  |  | NY1 | NY2 | NY3 | CA1 | CA2 | CA3 | CO1 | CO2 | CO3 |
| NY REGION | NY1 |  |  |  | 10Mbps | 10Mbps | 10Mbps | 50Mbps | 50Mbps | 50Mbps |
|  | NY2 |  |  |  | 10Mbps | 10Mbps | 10Mbps | 50Mbps | 50Mbps | 50Mbps |
|  | NY3 |  |  |  | 10Mbps | 10Mbps | 10Mbps | 50Mbps | 50Mbps | 50Mbps |
| CA REGION | CA1 | 10Mbps | 10Mbps | 10Mbps |  |  |  | 10Mbps | 10Mbps | 10Mbps |
|  | CA2 | 10Mbps | 10Mbps | 10Mbps |  |  |  | 10Mbps | 10Mbps | 10Mbps |
|  | CA3 | 10Mbps | 10Mbps | 10Mbps |  |  |  | 10Mbps | 10Mbps | 10Mbps |
| CO REGION | CO1 | 50Mbps | 50Mbps | 50Mbps | 10Mbps | 10Mbps | 10Mbps |  |  |  |
|  | CO2 | 50Mbps | 50Mbps | 50Mbps | 10Mbps | 10Mbps | 10Mbps |  |  |  |
|  | CO3 | 50Mbps | 50Mbps | 50Mbps | 10Mbps | 10Mbps | 10Mbps |  |  |  |

FIG. 7B

FIG. 8

METHOD AND SYSTEM FOR SHAPING TRAFFIC FROM AN EGRESS PORT IN A SOFTWARE-DEFINED WIDE AREA NETWORK

BACKGROUND

Modern businesses with distributed branches, such as banks or retail locations, are typically interconnected via an enterprise wide area network (WAN). The WAN can be implemented as a physical network or can be implemented in software, for example, as a software-defined wide area network (SD-WAN). When implemented as an SD-WAN, the WAN is typically implemented in a virtual environment. Due to implementation details and limitations related to virtual environments, techniques used for managing and configuring a physical WAN may be unavailable for managing or configuring a SD-WAN.

SUMMARY

In an embodiment, a method for shaping traffic from an egress port in a software-defined wide-area network (SD-WAN) is disclosed. In the embodiment, the method involves obtaining a stored network bandwidth measurement of the network bandwidth between a source endpoint and a destination endpoint, obtaining a current shaping rate used by the source endpoint when sending data to the destination endpoint, obtaining an updated measurement of the network bandwidth between the source endpoint and the destination endpoint, wherein the updated measurement of network bandwidth is obtained from an SD-WAN controller, determining a new shaping rate based on the stored network bandwidth measurement, the current shaping rate measurement, and the updated measurement of network bandwidth, and configuring the shaping rate used by the source endpoint when sending data to the destination endpoint with the new shaping rate.

In another embodiment, the SD-WAN controller from which the updated measurement of the network bandwidth is obtained manages at least one other endpoint in a region common with the source endpoint.

In another embodiment, the updated measurement of the network bandwidth is determined using service level agreement protocol data units (SLA PDUs) sent between the at least one other endpoint and the destination endpoint via the SD-WAN controller.

In another embodiment, the new shaping rate preserves bandwidth allocated to a network control channel and modifies bandwidth allocated to a best effort channel.

In another embodiment, the method for shaping traffic from the egress port in the SD-WAN is performed in response to determining that network control traffic is being lost, wherein it is determined that network control traffic is being lost when a forward error packet loss ratio for sending data to the destination endpoint exceeds a defined threshold.

In another embodiment, the method for shaping traffic from the egress port in the SD-WAN is performed in response to determining that an updated measurement of the network bandwidth is available, wherein determining that an updated measurement of the network bandwidth is available involves receiving an advertised updated measurement of the network bandwidth advertised by the SD-WAN controller to other endpoints managed by the SD-WAN controller.

In another embodiment, the new shaping rate is used by the source endpoint only when sending data to the destination endpoint.

In another embodiment, the new shaping rate is used by the source endpoint when sending data to endpoints in a region common to the destination endpoint.

In another embodiment, the source endpoint and the destination endpoint communicate using a connectionless protocol.

In another embodiment, a system for shaping traffic from an egress port in a software-defined wide-area network (SD-WAN) is disclosed. In the embodiment, the system is configured to obtain a stored network bandwidth measurement of the network bandwidth between a source endpoint and a destination endpoint from memory of the source endpoint, obtain a current shaping rate used by the source endpoint when sending data to the destination endpoint from the memory of the source endpoint, obtain an updated measurement of the network bandwidth between the source endpoint and the destination endpoint, wherein the updated measurement of network bandwidth is obtained from an SD-WAN controller, determine a new shaping rate based on the stored network bandwidth measurement, the current shaping rate measurement, and the updated measurement of network bandwidth, wherein the determination is performed by at least one of the source endpoint, SD-WAN controller, and destination endpoint, and configure the shaping rate used by the source endpoint when sending data to the destination endpoint with the new shaping rate, wherein the configuration is performed by at least one of the source endpoint and the SD-WAN controller.

In another embodiment, the SD-WAN controller from which the updated measurement of the network bandwidth is obtained manages at least one other endpoint in a region common with the source endpoint.

In another embodiment, the updated measurement of the network bandwidth is determined using service level agreement protocol data units (SLA PDUs) sent between the at least one other endpoint and the destination endpoint via the SD-WAN controller.

In another embodiment, the new shaping rate preserves bandwidth allocated to a network control channel and modifies bandwidth allocated to a best effort channel.

In another embodiment, the system is configured to perform in response to determining that network control traffic is being lost, wherein it is determined that network control traffic is being lost when a forward error packet loss ratio for sending data to the destination endpoint exceeds a defined threshold.

In another embodiment, the system is configured to perform in response to determining that an updated measurement of the network bandwidth is available, wherein determining that an updated measurement of the network bandwidth is available involves receiving an advertised updated measurement of the network bandwidth advertised by the SD-WAN controller to other endpoints managed by the SD-WAN controller.

In another embodiment, the new shaping rate is used by the source endpoint only when sending data to the destination endpoint.

In another embodiment, the new shaping rate is used by the source endpoint when sending data to endpoints in a region common to the destination endpoint.

In another embodiment, the source endpoint and the destination endpoint communicate using a connectionless protocol.

In another embodiment, a non-transitory computer-readable storage medium containing program instructions for shaping traffic from an egress port in a software-defined wide-area network (SD-WAN) is disclosed. In the embodiment, execution of the program instructions by one or more processors of a computer system causes the one or more processors to perform steps including obtaining a stored network bandwidth measurement of the network bandwidth between a source endpoint and a destination endpoint, obtaining a current shaping rate used by the source endpoint when sending data to the destination endpoint, obtaining an updated measurement of the network bandwidth between the source endpoint and the destination endpoint, wherein the updated measurement of network bandwidth is obtained from an SD-WAN controller, determining a new shaping rate based on the stored network bandwidth measurement, the current shaping rate measurement, and the updated measurement of network bandwidth, and configuring the shaping rate used by the source endpoint when sending data to the destination endpoint with the new shaping rate.

Other aspects and advantages of embodiments of the present invention will become apparent from the following detailed description, taken in conjunction with the accompanying drawings, illustrated by way of example of the principles of the invention.

BRIEF DESCRIPTION OF THE DRAWINGS

Throughout the description, similar reference numbers may be used to identify similar elements.

DETAILED DESCRIPTION

It will be readily understood that the components of the embodiments as generally described herein and illustrated in the appended figures could be arranged and designed in a wide variety of different configurations. Thus, the following more detailed description of various embodiments, as represented in the figures, is not intended to limit the scope of the present disclosure, but is merely representative of various embodiments. While the various aspects of the embodiments are presented in drawings, the drawings are not necessarily drawn to scale unless specifically indicated.

The present invention may be embodied in other specific forms without departing from its spirit or essential characteristics. The described embodiments are to be considered in all respects only as illustrative and not restrictive. The scope of the invention is, therefore, indicated by the appended claims rather than by this detailed description. All changes which come within the meaning and range of equivalency of the claims are to be embraced within their scope.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussions of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize, in light of the description herein, that the invention can be practiced without one or more of the specific features or advantages of a particular embodiment. In other instances, additional features and advantages may be recognized in certain embodiments that may not be present in all embodiments of the invention.

Reference throughout this specification to "one embodiment," "an embodiment," or similar language means that a particular feature, structure, or characteristic described in connection with the indicated embodiment is included in at least one embodiment of the present invention. Thus, the phrases "in one embodiment," "in an embodiment," and similar language throughout this specification may, but do not necessarily, all refer to the same embodiment.

Figure 1:
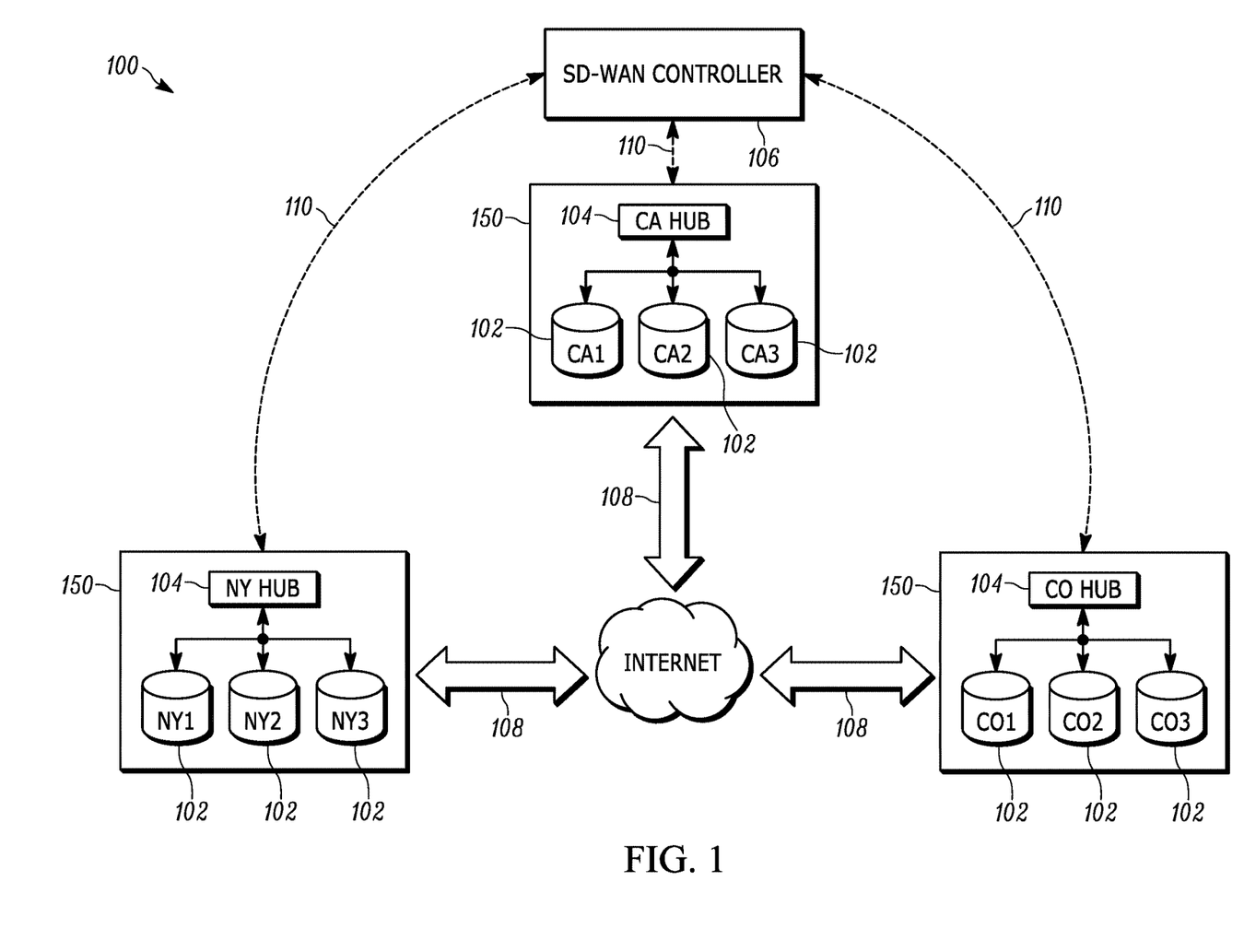
FIG. 1 illustrates a software-defined wide area network (SD-WAN).

FIG. 1 illustrates a software-defined wide area network (SD-WAN) 100. As illustrated, the SD-WAN spans three regions 150 and includes multiple interconnected endpoints 102, regional hubs 104, and a SD-WAN controller 106. In operation, endpoints may be branch offices having several terminals connected via a local area network managed by a local router (not shown). Endpoints can be configured to send data, to receive data, and to forward data. For simplicity of explanation herein, endpoints from which data originates are referred to as "source endpoints" and endpoints that receive the data are referred to as "destination endpoints," but each endpoint can be configured to send and receive data in practice. Regional hubs, or "hubs", interconnect endpoints within a region and traffic from endpoints in the region is routed through the regional hub. For example, endpoints NY1, NY2, and NY3 are in a New York region and are interconnected through a NY Hub. Traffic to endpoints in other regions from endpoints NY1-NY3 is routed through the NY Hub. Endpoints and hubs can be managed by a single SD-WAN controller (as illustrated in FIG. 1) or each region can be managed by a separate SD-WAN controller (not shown). In an embodiment, traffic between endpoints and hubs travels over in-band communication channels 108 using, for example, a connection-based protocol like Transmission Control Protocol/Internet Protocol (TCP/IP) or a connectionless protocol like User Datagram Protocol (UDP). Management traffic between the SD-WAN controller and endpoints or hubs travels over "out-of-band" communication channels 110 using, for example, Border Gateway Protocol (BGP). In other embodiments, traffic between endpoints and hubs as well as management traffic can both travel over the same communication channels.

In an embodiment, out-of-band management involves the use of a communication channel, that is secondary to a first communication channel, by which endpoints in the network can be managed. The first communication channel, typically referred to as the in-band channel, and the second communication channel, typically referred to as the out-of-band channel, may be implemented by physically or virtually separate network cards. For example, with reference to FIG. 1, an endpoint can be configured with a first network card for connecting to a first communication channel (e.g., in-band communication channel 108) and a second network card for connecting to a second communication channel (e.g., the out-of-band communication channel 110). Because the networks are separate, failure of one network or congestion of one network does not affect the other network. In other embodiments, a single network card with multiplexing functionality can be used to implement the first communication channel and the second communication channel.

In an Enterprise WAN environment, an SD-WAN may include hundreds or thousands of endpoints. In order to monitor the status of endpoints in the SD-WAN, a heartbeat protocol, such as a keepalive message, can be used to confirm that endpoints in the network are alive. In an embodiment, heartbeat traffic, such as a service level agreement protocol data unit (SLA PDU) generated by the heartbeat protocol, can be sent via a network control channel as described below.

Figure 2:
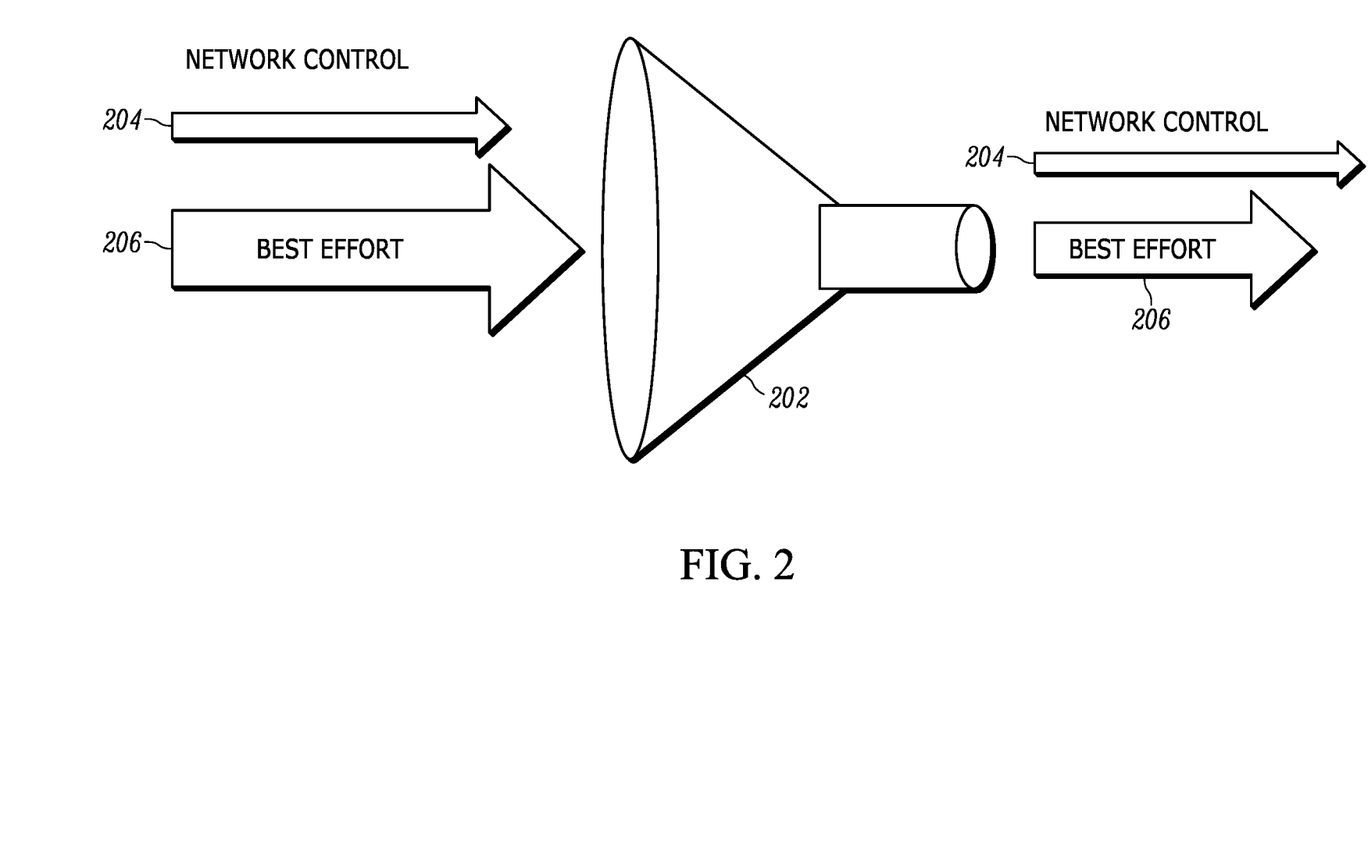
FIG. 2 is an illustration of traffic management at an egress port in an SD-WAN network.

FIG. 2 is an illustration of traffic management at an egress port 202 in an SD-WAN network. As illustrated in FIG. 2, traffic that controls or relates to the connectivity and reachability of an endpoint (e.g., SLA PDUs) can be managed as part of a network control channel 204, while all other traffic can be managed as part of one or more additional channels, the additional channels referred to collectively as a best effort channel 206.

In an embodiment, the amount of traffic on either side of the egress port is dependent on the amount of bandwidth available. For example, as illustrated in FIG. 2, traffic on the left side of the egress port corresponds to traffic within an endpoint, while the traffic on the right side of the egress port corresponds to traffic outside of the endpoint. For example, if the endpoint is a local branch office, then the traffic on the left side of the egress port would correspond to traffic across a local area network at the branch office, while the traffic on the right side of the egress port would correspond to traffic across the Internet. As illustrated in FIG. 2, more bandwidth is available on the left side of the egress port (as indicated by the larger best effort arrow) than is available on the right side of the egress port (as indicated by the smaller best effort arrow). Because the available bandwidth on the left side of the egress port is greater than the available bandwidth on the right side of the egress port, the egress port can be configured to shape the egressing traffic to reduce the traffic on the left side of the egress port when the traffic egresses through the egress port.

In an embodiment, when more bandwidth is available on one side of the egress port than the other, then the egress port can be configured to shape traffic from the side with more bandwidth down to the bandwidth available on the other side. Typically, the egress port shapes the egressing traffic to reduce the traffic (e.g., reduces the shaping rate), at least in part, by delaying or dropping packets. For example, traffic from a local area network with a bandwidth of 1 Gbps can be reduced down for egress on a 150 Mbps broadband Internet connection (e.g., a connection from an Internet service provider to the Internet backbone) by buffering or dropping approximately 85% of the egressing traffic. Thus, only 15% of the traffic within the endpoint will be able to make it across the network without being delayed or dropped by the egress port.

Because some traffic will have to be delayed or dropped, it can be beneficial for a user to be able to control which traffic is dropped. By dividing traffic into a network control channel and a best effort channel, as described above, traffic priority can be established. In an embodiment, an egress port can be configured such that, when the egressing traffic is shaped, network control traffic will be given priority and bandwidth allocated to network control traffic will be maintained, while best effort traffic will be delayed or dropped first. For example, with reference to FIG. 2, an endpoint can have a 100 Mbps local area network and 10 Mbps can be dedicated to network control traffic, while the remaining 90 Mbps can be used for best effort traffic. Then, when the egress port reduces the shaping rate, to send the traffic across a 20 Mbps Internet connection, the 10 Mbps dedicated to network control traffic will be maintained at 10 Mbps and, thus, only 10 Mbps will remain to be used for best effort traffic. Thus, as network bandwidth decreases, bandwidth allocated to the network control channel will typically be preserved, while bandwidth allocated to the best effort channel will be reduced so that traffic egressing from the egress port does not exceed available network bandwidth.

However, if the traffic is then routed over a network controlled by a third-party or an Internet service provider (ISP), preservation of the bandwidth allocated to the network control traffic may not be possible if the traffic is further shaped because third-party network or ISPs may not be able to recognize or identify the division of the traffic. As a result, traffic in the network control channel and the best effort channel may be dropped equally. Because traffic may be dropped equally, traffic that controls or relates to the connectivity and reachability of an endpoint (e.g., SLA PDUs) may be dropped. As a result, the sender of an SLA PDU, for example, could be incorrectly marked as down or unavailable.

In order to prevent network control traffic (e.g., traffic in the network control channel) from a source endpoint from being dropped on its way to a destination endpoint, the shaping rate of an egress port can be reduced by a source endpoint in response to detected lost network control traffic. In an embodiment, the loss of network control traffic can be detected when a forward error packet loss ratio for sending data to the destination endpoint, as defined below, is greater than zero or greater than a user-defined threshold. Because the source endpoint can maintain a network control channel and a best effort channel, the source endpoint can reduce best effort traffic, while preserving network control traffic such that the combined traffic from the source endpoint does not exceed available network bandwidth across networks on which traffic from the source endpoint would travels to the destination endpoint, thereby reducing the chance that traffic in the network control channel will be dropped.

In accordance with an embodiment of the invention, a method for shaping traffic from an egress port in a software-defined wide-area network (SD-WAN) is disclosed. In an embodiment, the method involves obtaining a stored network bandwidth measurement of the network bandwidth between a source endpoint and a destination endpoint, obtaining a current shaping rate used by the source endpoint when sending data to the destination endpoint, obtaining an updated measurement of the network bandwidth between the source endpoint and the destination endpoint, wherein the updated measurement of network bandwidth is obtained from an SD-WAN controller, determining a new shaping rate based on the stored network bandwidth measurement, the current shaping rate measurement, and the updated measurement of network bandwidth, and configuring the shaping rate used by the source endpoint when sending data to the destination endpoint with the new shaping rate. Thus, by shaping traffic egressing from the source endpoint before transmitting the traffic to the destination endpoint, bandwidth allocated to best effort traffic can be reduced, while bandwidth allocated to network control traffic can be preserved such that network control traffic will not be dropped. Additionally, according to an embodiment of the invention, the updated measurement of network bandwidth is obtained from the SD-WAN controller rather than determined and calculated by each source endpoint. In an embodiment, the SD-WAN controller can store the bandwidth measurement from one source endpoint and advertise the bandwidth measurement to other source endpoints managed by the SD-WAN controller. Accordingly, the detection of bandwidth changes can be a distributed process, which can reduce the resource demand on an individual source endpoint for detecting bandwidth changes.

Figure 3:
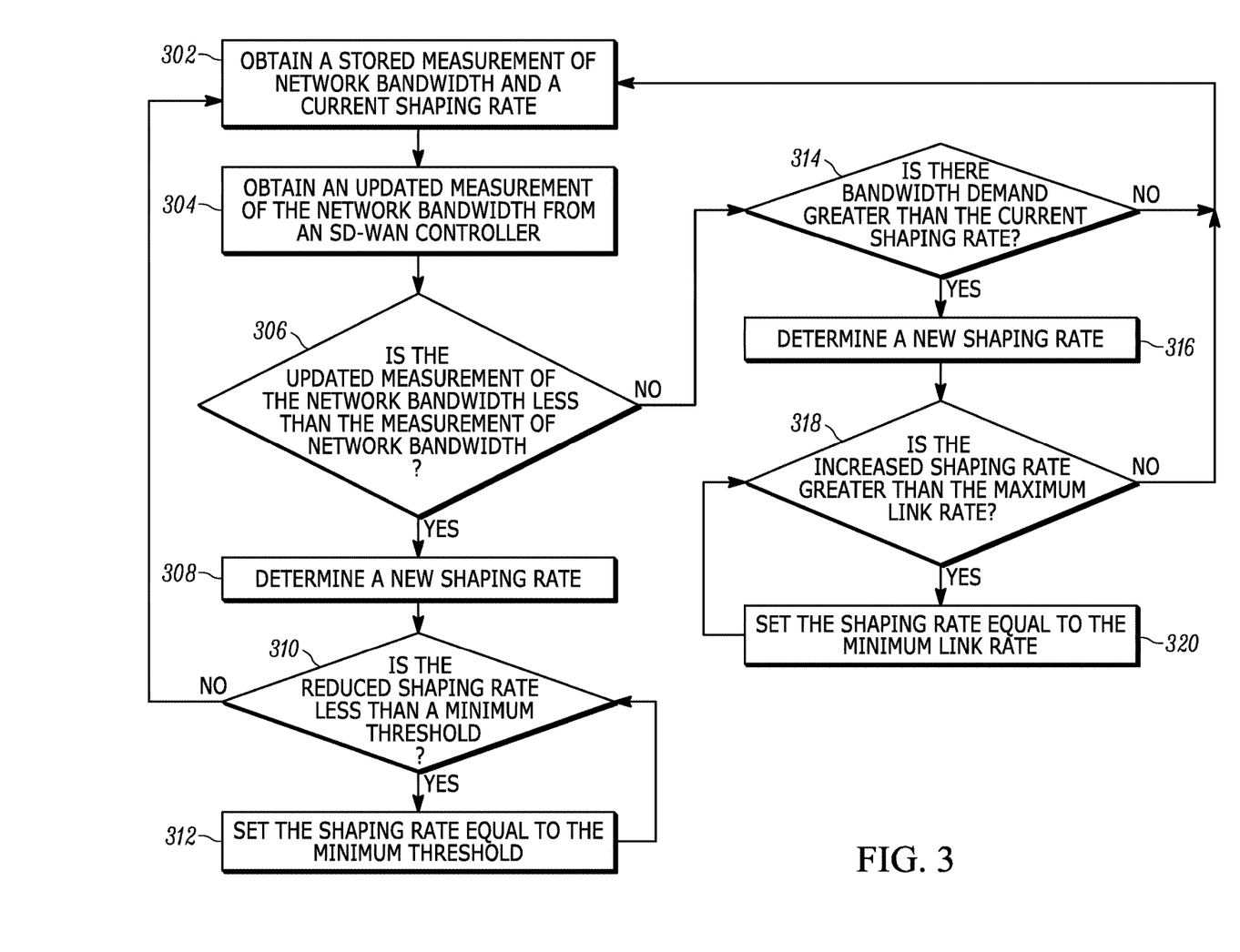
FIG. 3 is a flow chart diagram of a method for configuring the shaping rate of traffic from an egress port in an SD-WAN network in accordance with an embodiment of the invention.

FIG. 3 is a flow chart diagram of a method for configuring the shaping rate of traffic from an egress port in an SD-WAN network in accordance with an embodiment of the invention. The flow of FIG. 3 is an iterative flow that continually repeats on a user-defined interval. In another embodiment, the flow can be performed in response to determining that network control traffic is being dropped or when an updated measurement of network bandwidth is advertised.

At block 302, a stored network bandwidth measurement and a current shaping rate are obtained. In an embodiment, the stored network bandwidth measurement and the current shaping rate can be values stored in the memory of a source endpoint. For example, when a source endpoint is configured, the source endpoint can perform an initial measurement of its network bandwidth using a test server and then derive a corresponding shaping rate based on the measurement. The initial network bandwidth measurement and the corresponding shaping rate can be stored in memory and used for sending data across a network on an egress port.

In an embodiment, the measurement of network bandwidth can be previously determined using packets carrying Service Level Agreement (SLA) protocol data units (PDUs) as well as actual customer traffic (inline loss). For example, a source endpoint can be configured to send a variable number of packets carrying actual customer traffic to the test server or a destination endpoint in a five-second window. At the end of the five-second window, the source endpoint can send the test server or the destination endpoint a SLA PDU indicating the number of packets that were sent. A forward packet loss ratio can then be calculated from the number of packets received by the test server or destination endpoint and the number of packets indicated by the SLA PDU. The forward packet loss ratio can then be used to calculate a measurement of network bandwidth, which the test server or destination endpoint can send to a SD-WAN controller managing the source endpoint. For example, with reference to FIG. 1, NY1 can determine a measurement of network bandwidth between NY1 and CA1 by sending one hundred packets at 50 Mbps (e.g., the stored network bandwidth measurement) and an SLA PDU indicating that one hundred packets were sent to CAL CA1 can then compare the number of packets received to the number of packets indicated by the SLA PDU. If less than one hundred packets were received (e.g., the forward packet loss ratio is greater than zero), then CA1 can send an SLA PDU back to NY1 indicating that a reduced bandwidth should be used. NY1 can then send another one hundred packets and an SLA PDU at 25 Mbps. The process can repeat until the destination endpoint determines that the forward packet loss ratio is zero. In an embodiment, the SLA PDUs can be sent via the same connection (e.g., via an in-band connection) as the packets. In another embodiment, the SLA PDUs can be sent out-of-band via a connection to one or more SD-WAN controllers. Once the destination endpoint determines that the forward packet loss ratio is zero and sends an SLA PDU back to NY1 indicating that the current bandwidth is sufficient, NY1 can store the current bandwidth as the network bandwidth measurement and derive and store a corresponding shaping rate from the stored network bandwidth measurement. The network bandwidth measurement can be sent to one or more SD-WAN controllers managing NY1.

Figure 4:
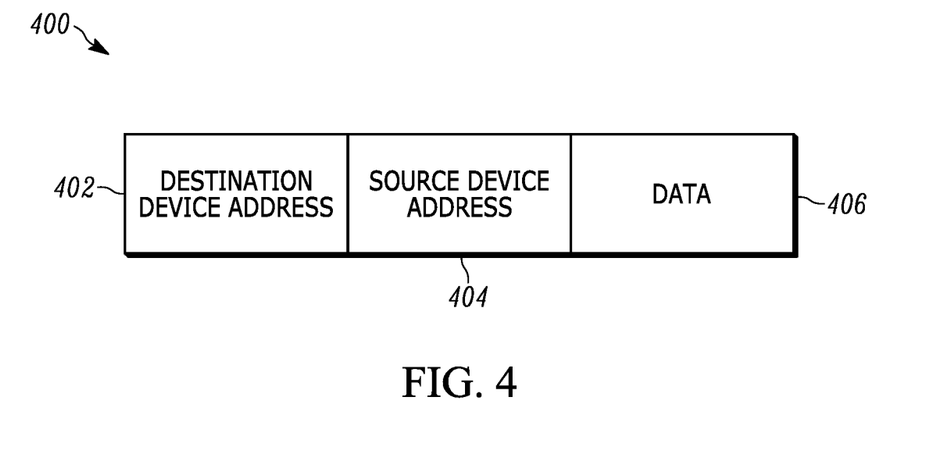
FIG. 4 depicts the format of a PDU.

FIG. 4 depicts the format of a PDU 400. For example, a frame generated by Layer 2 of the Open Systems Interconnection model (OSI model). The Layer 2 frame includes a header followed by encapsulated data from higher layers such as a Layer 3 PDU (e.g., a packet) or a Layer 4 PDU (e.g., a UDP datagram). The header includes a destination device address field 402 (e.g., an Ethernet MAC address), a source device address field 404 (e.g., an Ethernet MAC address), and the encapsulated data in a data field 406. A PDU can be configured as an SLA PDU by configuring the PDU to carry information used in measuring SLA performance. In an embodiment, SLA PDUs can be sent over an in-band connection or over an out-of-band connection. For example, actual customer traffic can be sent via a typical commercial broadband connection, while SLA PDUs can be sent via a separate MPLS broadband connection to a SD-WAN controller.

Returning to FIG. 3, at block 304, an updated measurement of the network bandwidth is obtained from an SD-WAN controller. In an embodiment, the updated measurement of the network bandwidth can be determined by another endpoint managed by the SD-WAN controller and stored in the SD-WAN controller. For example, with reference to FIG. 1, if NY1 and CA1 determine a measurement of network bandwidth, as described above with reference to block 302, the measurement can be stored in the SD-WAN controller managing NY2 and NY3. Then, NY2 and NY3 can obtain the measurement of network bandwidth from the SD-WAN controller without having to send SLA PDUs or to otherwise determine a measurement of network bandwidth.

At decision point 306, it is determined if the updated measurement of the network bandwidth is less than the stored measurement of network bandwidth obtained at block 302. If the updated measurement of the network bandwidth is less than the measurement of network bandwidth obtained at block 302, then, at block 308, a new shaping rate is determined. In an embodiment, a new shaping rate can be determined from a pre-defined set of shaping rates or the new shaping rate can be a calculated rate. For example, if the updated measurement of the network bandwidth is less than the measurement of network bandwidth obtained at block 302, then a reduced shaping rate (e.g., a shaping rate that results in reduced bandwidth) can be determined by calculating a new shaping rate that is reduced by a percentage statically defined by the user (e.g., 10% reduction). Alternatively, the reduced shaping rate can be determined dynamically at a rate defined by a user based on the degree of the forward packet loss ratio. At decision point 310, it is determined if the reduced shaping rate is less than a minimum threshold. In an embodiment, the minimum threshold can be an arbitrary value, a user-defined value (e.g., a user-defined minimum), or a value equal to a minimum data rate required in order to send the traffic in the network control channel without any packet loss. At block 312, if the reduced shaping rate is less than the minimum threshold, then the reduced shaping rate is set equal to the minimum threshold. Otherwise, the process returns to block 302 for the next iteration.

Alternatively, at decision point 306, if the updated measurement of the network bandwidth is equal to (or greater) than the stored measurement of network bandwidth obtained at block 302, then additional network bandwidth may be available. At decision point 314, it is determined if there is a greater demand for bandwidth than the current shaping rate allows. For example, if a source endpoint is generating data for transmission at a rate of 10 Mbps, then the source endpoint has a bandwidth demand of 10 Mbps. Thus, if the current shaping rate is set to 5 Mbps, there is a bandwidth demand that is greater than the current shaping rate. If the bandwidth demand is not greater than the current shaping rate, then the process returns to block 302 for the next iteration.

If the bandwidth demand is greater than the current shaping rate, then, at block 316, a new shaping rate is determined. Here, where the bandwidth demand is greater than the current shaping rate, the shaping rate is increased (e.g., the shaping rate is modified resulting in increased bandwidth). In an embodiment, a user can define how the shaping rate is increased. For example, the shaping rate can be increased by a percentage statically defined by the user. In another embodiment, the shaping rate can be increased dynamically at a rate defined by a user based on the degree of the bandwidth demand. At decision point 318, it is determined if the increased shaping rate is greater than the maximum link rate and, if the increased shaping rate is greater than the maximum link rate, then, at block 320, the shaping rate is set equal to the maximum link rate. For example, if the maximum network bandwidth is 20 Mbps and the shaping rate is increased to 22 Mbps, then the shaping rate will only be increased to 20 Mbps. If the shaping rate is not greater than the maximum network bandwidth, then the increased shaping rate is adopted and the process returns to block 302. In an embodiment, the method of FIG. 3 can be repeated once every user-defined interval. For example, the steps of the method can be automatically repeated every five seconds. In another embodiment, the method of FIG. 3 can be repeated when a loss of network traffic is detected. In another embodiment, the method of FIG. 3 can be repeated when an updated measurement of network bandwidth is available.

In an embodiment, the steps in the flow described with reference to FIG. 3 can be performed by a source endpoint, by an SD-WAN controller, in part by the source endpoint and in part by the SD-WAN controller, or by a combination of the source endpoint, destination endpoint, and the SD-WAN controller. In an embodiment in which the steps are performed by the source endpoint, a new shaping rate (e.g., an increased or reduced shaping rate) is determined by the source endpoint based on the stored network bandwidth measurement, the current shaping rate, and the updated network bandwidth measurement. In an embodiment in which the steps are performed, in part, by the SD-WAN controller, the SD-WAN controller receives a shaping rate determined by another endpoint that is managed by the SD-WAN controller and sends the received shaping rate to the source endpoint in lieu of the source endpoint calculating a new shaping rate.

As described with reference to FIG. 3, an updated measurement of network bandwidth can be determined by an endpoint managed by the SD-WAN controller, stored in the SD-WAN controller, and obtained by other endpoints managed by the SD-WAN controller. In accordance with an embodiment of the invention, the SD-WAN controller can extrapolate the measurements of network bandwidth for the other endpoints managed by the SD-WAN controller.

Figure 5:
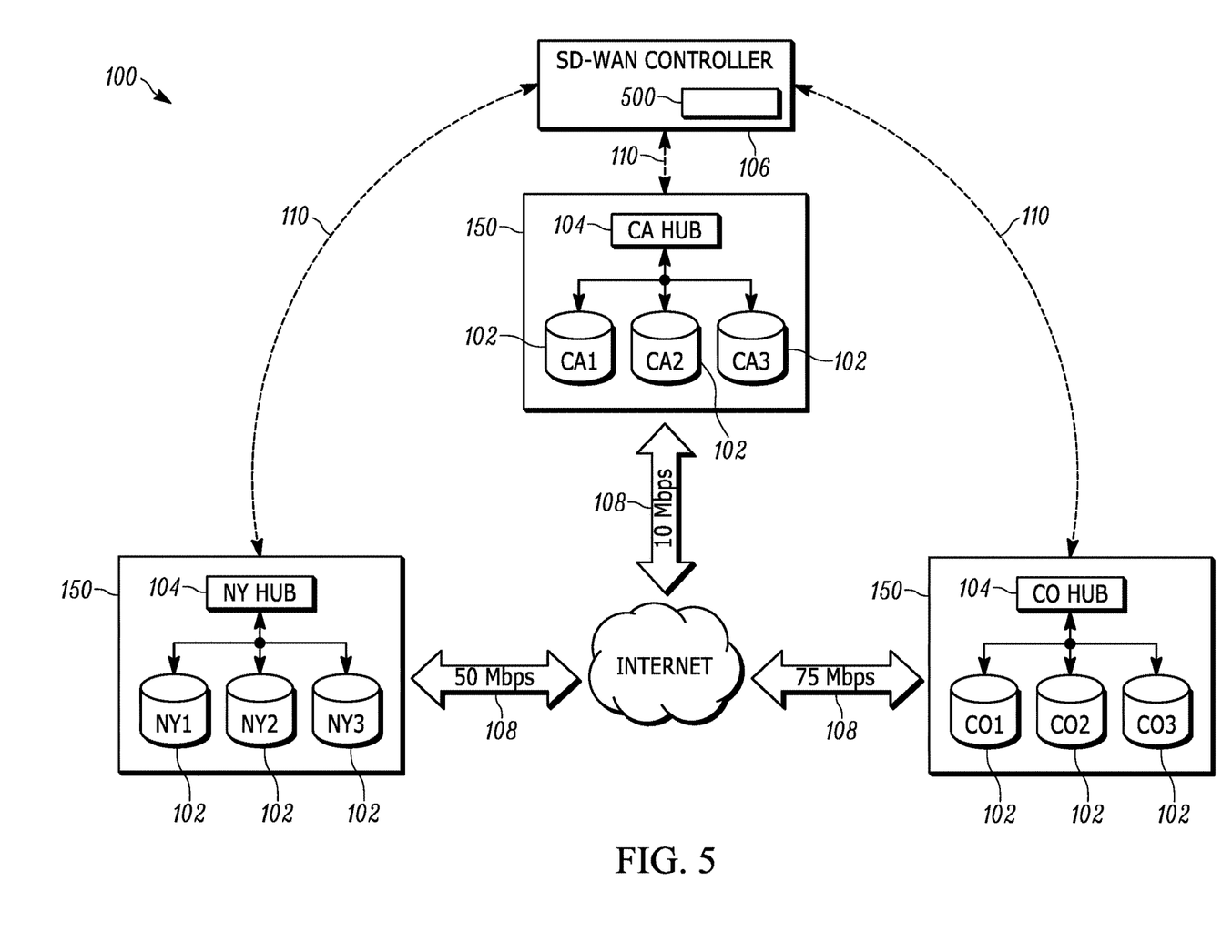
FIG. 5 illustrates bandwidth measurement extrapolation in an SD-WAN network.

FIG. 5 illustrates bandwidth measurement extrapolation in an SD-WAN network. The SD-WAN network in FIG. 5 is the SD-WAN network described with reference to FIG. 1 with the addition of a table 500 indicating measurements of network bandwidth, as described below, stored in the SD-WAN controller. In other embodiments, the table can be stored additionally or alternatively within hubs or endpoints.

As illustrated, endpoints in the NY region have a 50 Mbps connection to the Internet backbone, endpoints in the CA region have a 10 Mbps connection to the Internet backbone, and endpoints in the CO region have a 75 Mbps connection to the Internet backbone. When a measurement of network bandwidth is determined for a first NY endpoint (e.g., NY1) and a first CA endpoint (e.g., CA1), a SD-WAN controller managing the NY endpoints can store the measurement of network bandwidth.

Figure 6:
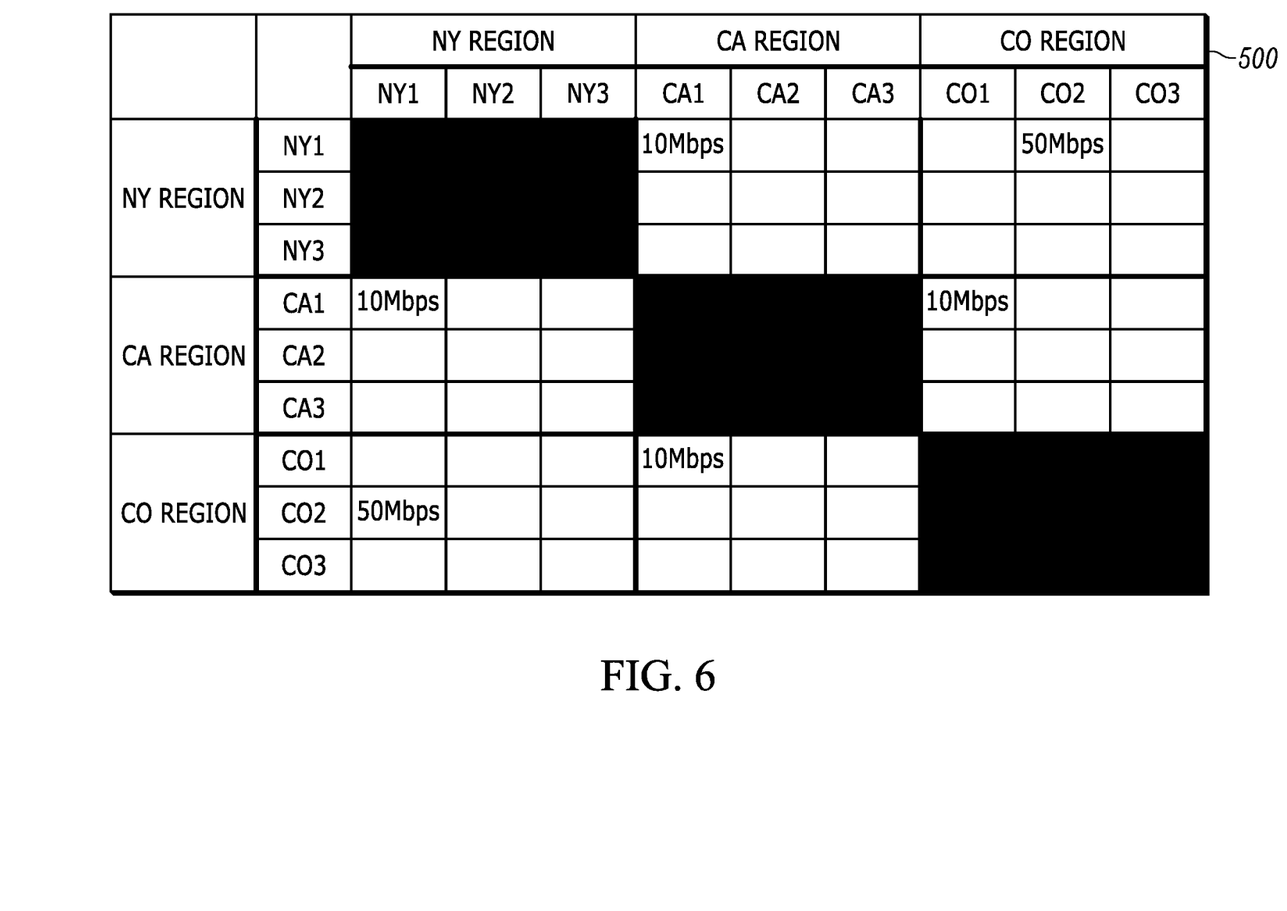
FIG. 6 is an example of a table indicating measurements of network bandwidth.

FIG. 6 is an example of a table 500 indicating measurements of network bandwidth as stored in an SD-WAN controller. As indicated by the example of FIG. 6, measurements of network bandwidth have been determined for three scenarios: a transmission between NY1 and CA1, a transmission between NY1 and CO2, and a transmission between CA1 and CO1. The measurements of network bandwidth for the three scenarios have been stored in the table. As shown, the measurement of network bandwidth between NY1 and CA1 is 10 Mbps because NY1 has a 50 Mbps connection to the Internet, while CA1 has only a 10 Mbps connection to the Internet, as indicated by FIG. 5. Similarly, because NY1 has a 50 Mbps connection to the Internet, while CO2 has a 75 Mbps connection to the Internet, the measurement of network bandwidth between NY1 and CO2 is 50 Mbps and because CA1 has a 10 Mbps connection to the Internet, while CO1 has a 75 Mbps connection to the Internet, the measurement of network bandwidth between CA1 and CO1 is 10 Mbps. That is, the endpoints' connection to the Internet backbone is a bottleneck that limits the resulting measurement of network bandwidth between two endpoints to the slowest connection to the Internet backbone for either endpoint.

Referring again to FIG. 5, once the measurement of network bandwidth has been stored in the table, the SD-wan controller can extrapolate measurements of network bandwidth for all endpoints it controls. In an embodiment, the SD-WAN controller is able to extrapolate the measurements of network bandwidth for all endpoints it controls based on known network configurations and varying degrees of assumptions about unknown network configurations.

For example, in a first embodiment, the SD-WAN controller managing the NY endpoints knows the configuration of all NY endpoints' connection to the Internet. However, the SD-WAN controller managing the NY endpoints may not know the configuration of any of the CA endpoints' connection to the Internet. Accordingly, the SD-WAN controller managing the NY endpoints knows that the connection to the Internet is the same for each NY endpoint and assumes that, once data reaches the Internet, data will take the same path to the first CA endpoint as it did with the first NY endpoint. Based on this assumption, the SD-WAN controller managing the NY endpoints can extrapolate the measurements of network bandwidth for all NY endpoints when sending data to the first CA endpoint.

Figure 7A:
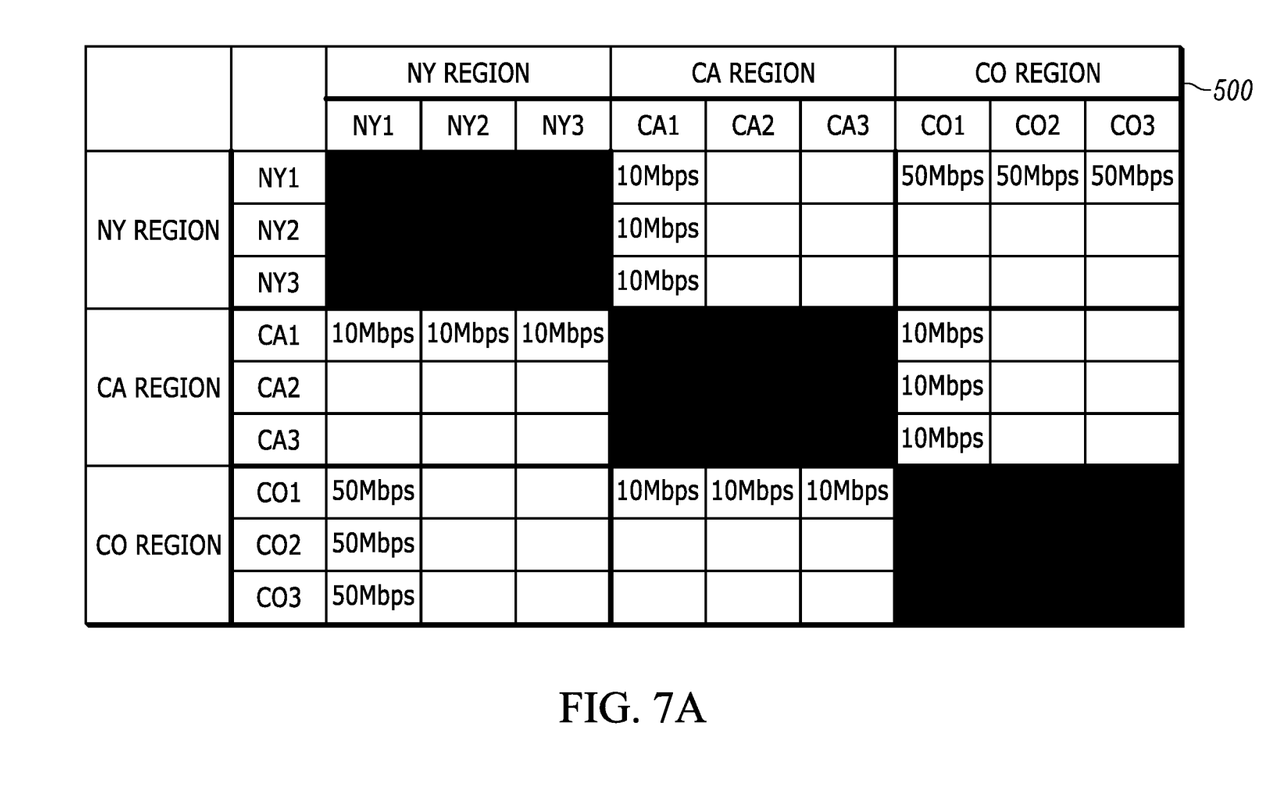
FIG. 7A is a table indicating a bandwidth measurement extrapolation based on the table of FIG. 6 in accordance with a first embodiment.

FIG. 7A is a table 500 indicating a bandwidth measurement extrapolation based on the table of FIG. 6 in accordance with the first embodiment. Because a measurement of network bandwidth has been determined for the three scenarios described above, the SD-WAN controller can extrapolate measurements of network bandwidth all NY endpoints when sending data to CA1, for all CO endpoints when sending to NY1, and for all CA endpoints when sending to CO1, as indicated by the table.

In a second example, the SD-WAN controller managing the NY endpoints assumes that, once data reaches the Internet, data will take the same path to any of the CA endpoints as it did for the first CA endpoint and extrapolates the measurements of network bandwidth for all NY endpoints when sending data to any CA endpoint.

Figure 7B:
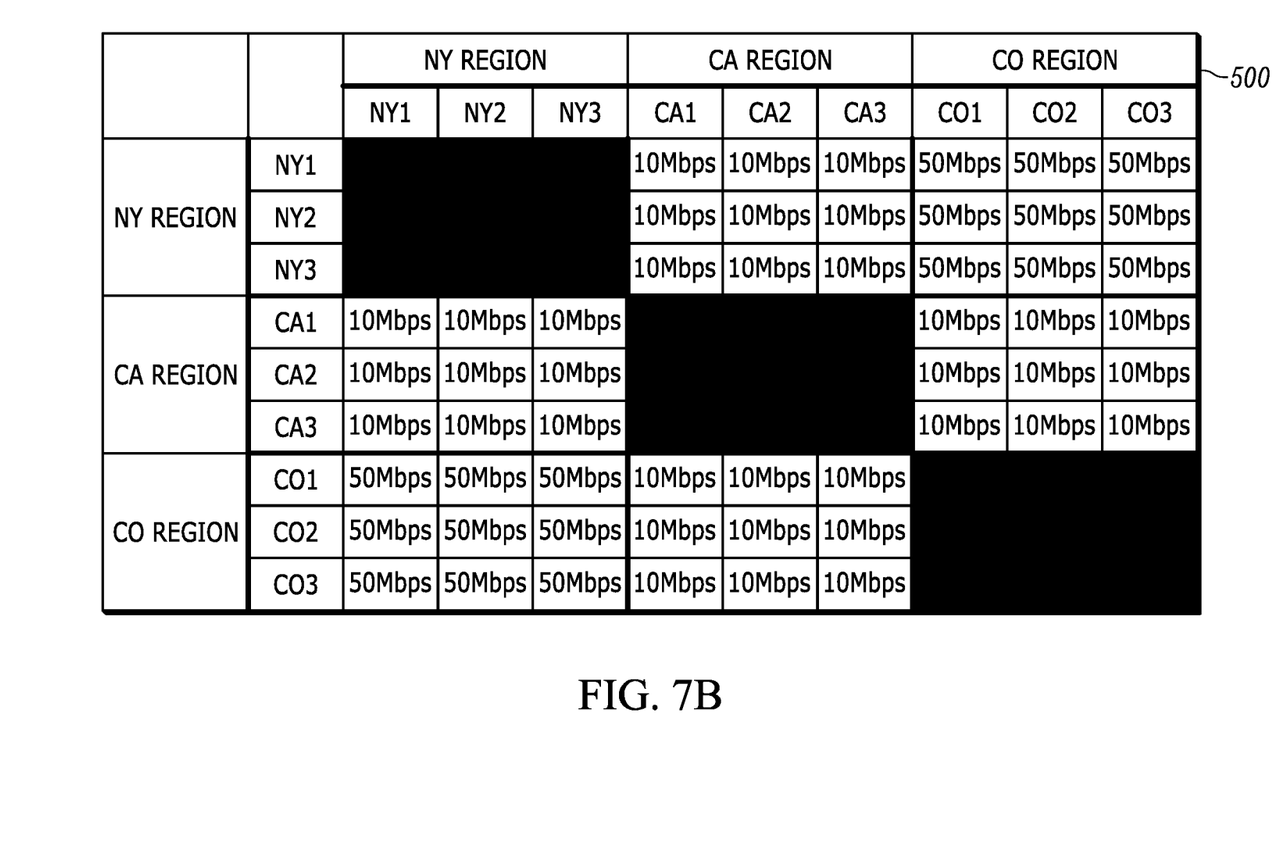
FIG. 7B is a table indicating a bandwidth measurement extrapolation based on the table of FIG. 6 in accordance with a second embodiment.

FIG. 7B is a table 500 indicating a bandwidth measurement extrapolation based on the table of FIG. 6 in accordance with the second embodiment. Because a measurement of network bandwidth has been determined for the three scenarios described above, the SD-WAN controller can extrapolate measurements of network bandwidth for all NY endpoints when sending data to any CA endpoint, for all CO endpoints when sending to any NY endpoint, and for all CA endpoints when sending to any CO endpoint, as indicated by the table.

Figure 8:
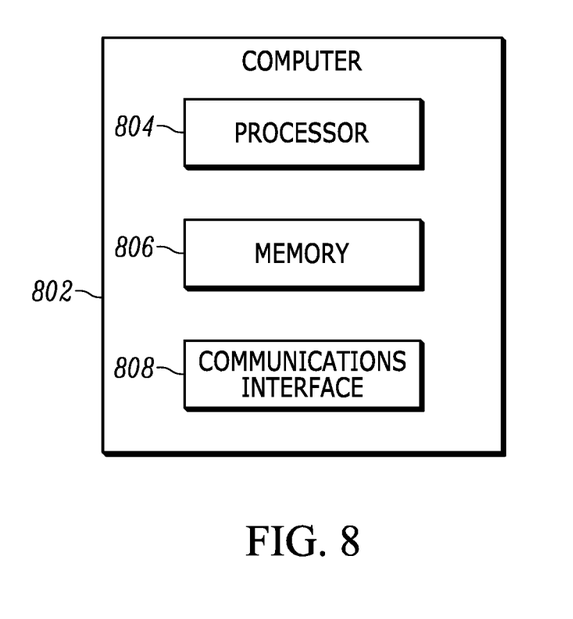
FIG. 8 is a block diagram of a computer.

FIG. 8 is a block diagram of a computer 800 that includes a processor 802, memory 804, and a communications interface 806. The processor may include a multifunction processor and/or an application-specific processor. Examples of processors include the PowerPC™ family of processors by IBM and the x86 family of processors by Intel. The memory within the computer may include, for example, a non-transitory storage medium such as read only memory (ROM), flash memory, RAM, and a large capacity permanent storage device such as a hard disk drive. The communications interface enables communications with other computers via, for example, the Internet Protocol (IP). The computer executes computer readable instructions stored in the storage medium to implement various tasks as described above.

Although the operations of the method(s) herein are shown and described in a particular order, the order of the operations of each method may be altered so that certain operations may be performed in an inverse order or so that certain operations may be performed, at least in part, concurrently with other operations. In another embodiment, instructions or sub-operations of distinct operations may be implemented in an intermittent and/or alternating manner.

It should also be noted that at least some of the operations for the methods may be implemented using software instructions stored on a computer useable storage medium for execution by a computer. As an example, an embodiment of a computer program product includes a computer useable storage medium to store a computer readable program that, when executed on a computer, causes the computer to perform operations, as described herein.

Furthermore, embodiments of at least portions of the invention can take the form of a computer program product accessible from a computer-usable or computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device.

The computer-useable or computer-readable medium can be an electronic, magnetic, optical, electromagnetic, infrared, or semiconductor system (or apparatus or device), or a propagation medium. Examples of a computer-readable medium include a semiconductor or solid state memory, magnetic tape, a removable computer diskette, a random access memory (RAM), a read-only memory (ROM), a rigid magnetic disc, and an optical disc. Current examples of optical discs include a compact disc with read only memory (CD-ROM), a compact disc with read/write (CD-R/W), a digital video disc (DVD), and a Blu-ray disc.

In the above description, specific details of various embodiments are provided. However, some embodiments may be practiced with less than all of these specific details. In other instances, certain methods, procedures, components, structures, and/or functions are described in no more detail than to enable the various embodiments of the invention, for the sake of brevity and clarity.

Although specific embodiments of the invention have been described and illustrated, the invention is not to be limited to the specific forms or arrangements of parts so described and illustrated. The scope of the invention is to be defined by the claims appended hereto and their equivalents.

What is claimed is:

1. A method for shaping traffic from an egress port in a software-defined wide-area network (SD-WAN), the method comprising:
   obtaining a stored network bandwidth measurement of the network bandwidth between a source endpoint and a destination endpoint;
   obtaining a current shaping rate used by the source endpoint when sending data to the destination endpoint;
   obtaining an updated measurement of the network bandwidth between the source endpoint and the destination endpoint from an SD-WAN controller;
   determining a new shaping rate based on the stored network bandwidth measurement, the current shaping rate measurement, and the updated measurement of network bandwidth; and
   configuring the shaping rate used by the source endpoint when sending data to the destination endpoint with the new shaping rate;
   wherein the SD-WAN controller from which the updated measurement of the network bandwidth is obtained manages at least one other endpoint in a region common with the source endpoint;
   wherein the updated measurement of the network bandwidth is determined using service level agreement protocol data units (SLA PDUs) sent between the at least one other endpoint and the destination endpoint.

2. The method of claim 1, wherein the new shaping rate preserves bandwidth allocated to a network control channel and modifies bandwidth allocated to a best effort channel.

3. The method of claim 1, wherein the method is performed in response to determining that an updated measurement of the network bandwidth is available, wherein determining that an updated measurement of the network bandwidth is available involves receiving an advertised updated measurement of the network bandwidth advertised by an SD-WAN controller to other endpoints managed by the SD-WAN controller.

4. The method of claim 1, wherein the new shaping rate is used by the source endpoint only when sending data to the destination endpoint.

5. The method of claim 1, wherein the new shaping rate is used by the source endpoint when sending data to endpoints in a region common to the destination endpoint.

6. The method of claim 1, wherein the source endpoint and the destination endpoint communicate using a connectionless protocol.

7. A system for shaping traffic from an egress port in a software-defined wide-area network (SD-WAN), the system configured to:

obtain a stored network bandwidth measurement of the network bandwidth between a source endpoint and a destination endpoint from memory of the source endpoint;

obtain a current shaping rate used by the source endpoint when sending data to the destination endpoint from the memory of the source endpoint;

obtain an updated measurement of the network bandwidth between the source endpoint and the destination endpoint from an SD-WAN controller;

determine a new shaping rate based on the stored network bandwidth measurement, the current shaping rate measurement, and the updated measurement of network bandwidth, wherein the determination is performed by at least one of the source endpoint; and configure the shaping rate used by the source endpoint when sending data to the destination endpoint with the new shaping rate;

wherein the SD-WAN controller from which the updated measurement of the network bandwidth is obtained manages at least one other endpoint in a region common with the source endpoint;

wherein the updated measurement of the network bandwidth is determined using service level agreement protocol data units (SLA PDUs) sent between the at least one other endpoint and the destination endpoint.

8. The system of claim 7, wherein the new shaping rate preserves bandwidth allocated to a network control channel and modifies bandwidth allocated to a best effort channel.

9. The system of claim 7, wherein the system is configured to perform in response to determining that an updated measurement of the network bandwidth is available, wherein determining that an updated measurement of the network bandwidth is available involves receiving an advertised updated measurement of the network bandwidth advertised by the SD-WAN controller to other endpoints managed by the SD-WAN controller.

10. The system of claim 7, wherein the new shaping rate is used by the source endpoint only when sending data to the destination endpoint.

11. The system of claim 7, wherein the new shaping rate is used by the source endpoint when sending data to endpoints in a region common to the destination endpoint.

12. The system of claim 7, wherein the source endpoint and the destination endpoint communicate using a connectionless protocol.

13. A non-transitory computer-readable storage medium containing program instructions for shaping traffic from an egress port in a software-defined wide-area network (SD-WAN), wherein execution of the program instructions by one or more processors of a computer system causes the one or more processors to perform steps comprising:

obtaining a stored network bandwidth measurement of the network bandwidth between a source endpoint and a destination endpoint;

obtaining a current shaping rate used by the source endpoint when sending data to the destination endpoint;

obtaining an updated measurement of the network bandwidth between the source endpoint and the destination endpoint from an SD-WAN controller;

determining a new shaping rate based on the stored network bandwidth measurement, the current shaping rate measurement, and the updated measurement of network bandwidth; and configuring the shaping rate used by the source endpoint when sending data to the destination endpoint with the new shaping rate;

wherein the SD-WAN controller from which the updated measurement of the network bandwidth is obtained manages at least one other endpoint in a region common with the source endpoint;

wherein the updated measurement of the network bandwidth is determined using service level agreement protocol data units (SLA PDUs) sent between the at least one other endpoint and the destination endpoint.

14. The method of claim 1, wherein the SLA PDUs indicate a number of packets sent from the source endpoint for use in determining the updated measurement of the network bandwidth.

15. The system of claim 7, wherein the SLA PDUs indicate a number of packets sent from the source endpoint for use in determining the updated measurement of the network bandwidth.

16. The non-transitory computer-readable storage medium of claim 13, wherein the SLA PDUs indicate a number of packets sent from the source endpoint for use in determining the updated measurement of the network bandwidth.

* * * * *